United States Patent [19]
Lund

[11] Patent Number: 5,662,356
[45] Date of Patent: Sep. 2, 1997

[54] ROLL CORRECTION SYSTEM WITH COUNTERSTEER COMPENSATION

[75] Inventor: Mark A. Lund, Escondido, Calif.

[73] Assignee: TLC Suspension, Chula Vista, Calif.

[21] Appl. No.: 427,792

[22] Filed: Apr. 26, 1995

[51] Int. Cl.$^6$ ................................................. B60G 21/06
[52] U.S. Cl. .......................... 280/772; 280/689; 280/714; 267/187
[58] Field of Search ........................... 280/689, 772, 280/112.2, 6.12, 6.1, 709, 710, 714, 723; 267/187, 191, 277

[56] References Cited

U.S. PATENT DOCUMENTS

| | | | |
|---|---|---|---|
| 4,844,506 | 7/1989 | Moriguchi et al. | 280/689 |
| 5,161,822 | 11/1992 | Lund | 280/772 |
| 5,174,603 | 12/1992 | Lund | 280/772 |
| 5,219,181 | 6/1993 | Lund | 280/772 |
| 5,362,094 | 11/1994 | Jensen | 280/689 |
| 5,529,324 | 6/1996 | Krawczyk et al. | 280/689 |
| 5,549,328 | 8/1996 | Cubalchini et al. | 280/689 |

*Primary Examiner*—Brian L. Johnson
*Assistant Examiner*—Peter C. English
*Attorney, Agent, or Firm*—Baker, Maxham, Jester & Meador

[57] ABSTRACT

A roll correction system for use in a vehicle including a body, wheels, and a suspension coupling the body to the wheels includes a roll correction apparatus hydraulically actuated by a hydraulic signal indicative of a roll direction. A hydraulic signal source provides the hydraulic signal conditioned to indicate a roll position in response to a first steering direction. A countersteer correction element maintains the condition of the hydraulic signal to indicate the roll direction in response to countersteer in a second steering direction opposite the first steering direction as would occur, for example, in a skid.

11 Claims, 10 Drawing Sheets

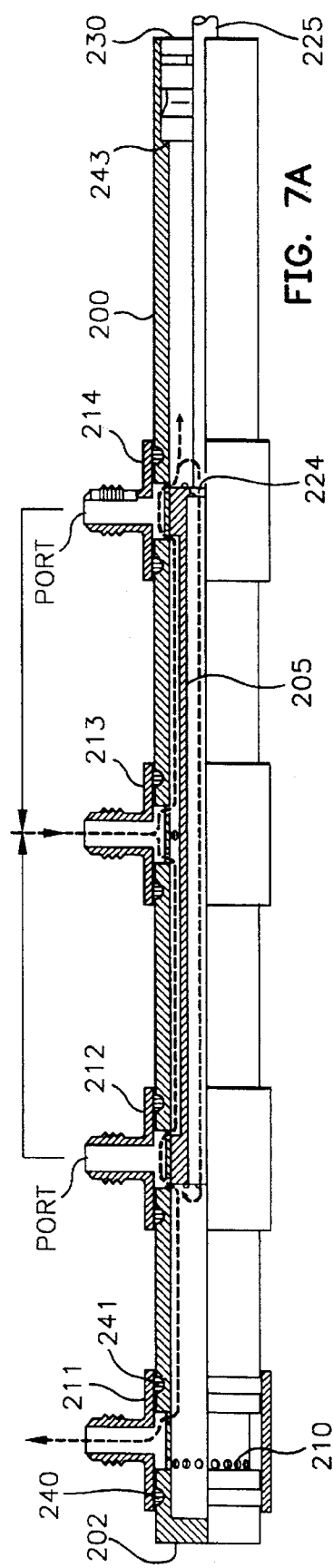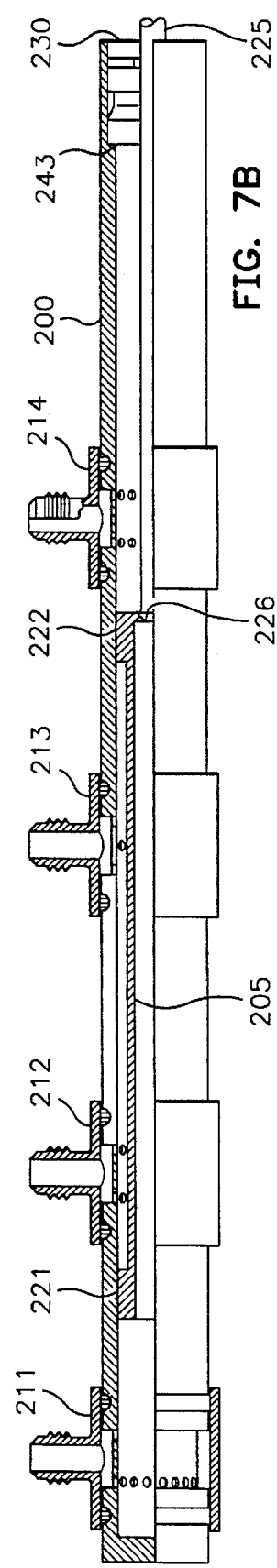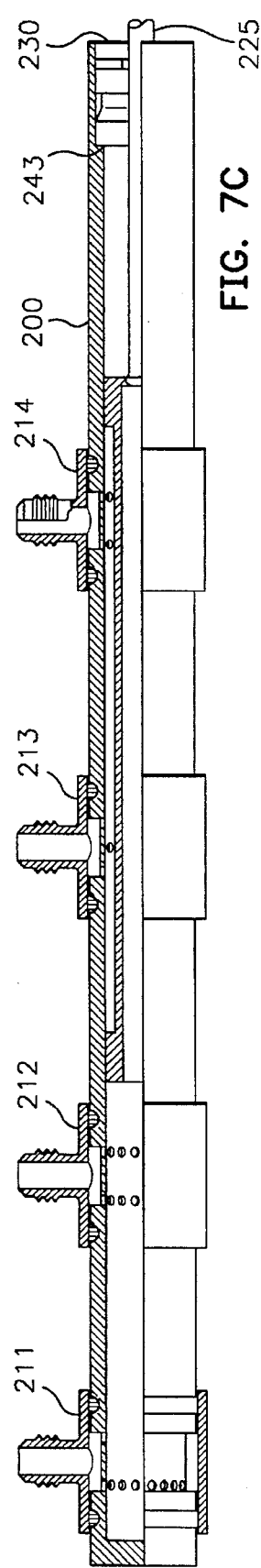

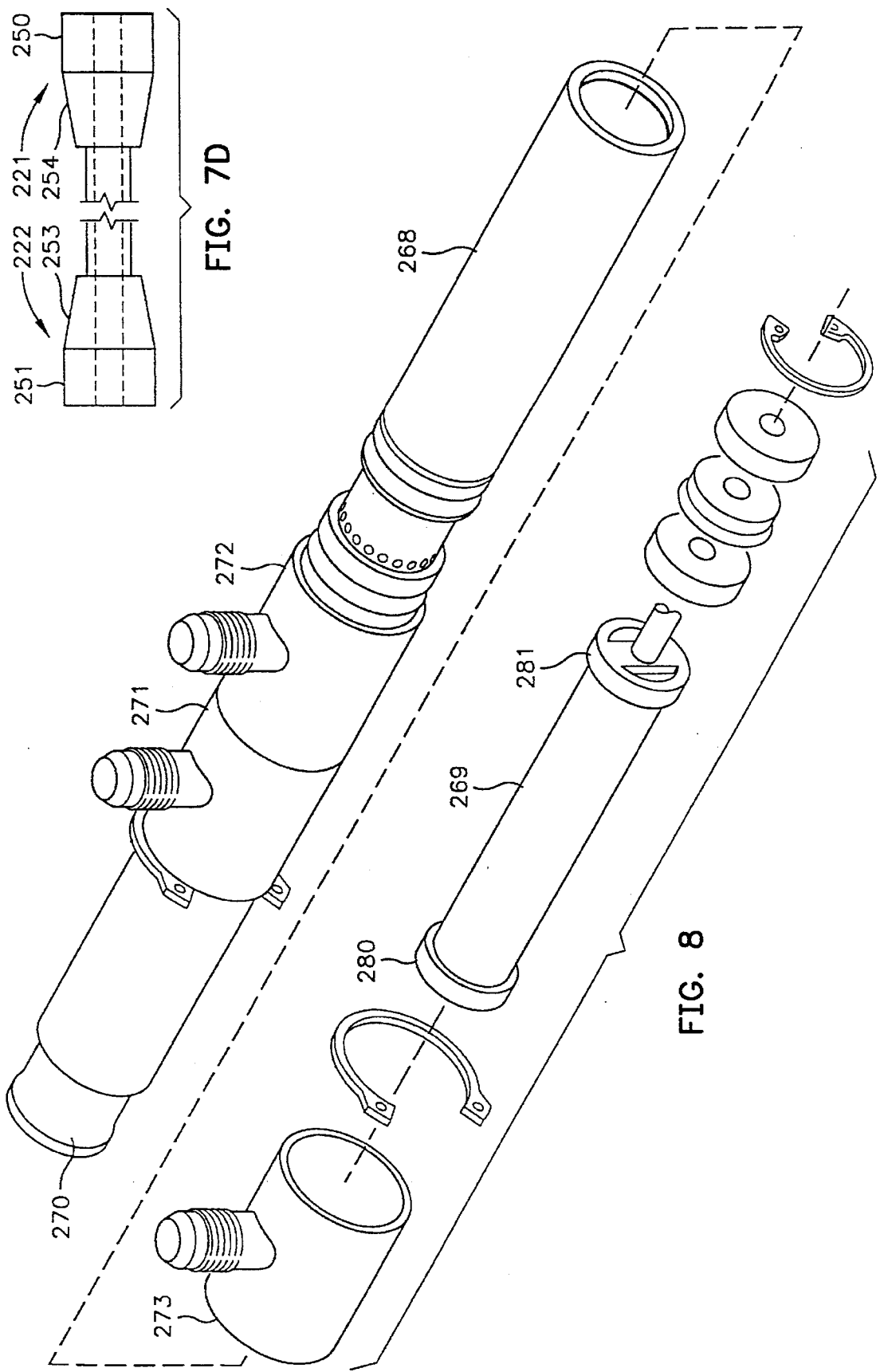

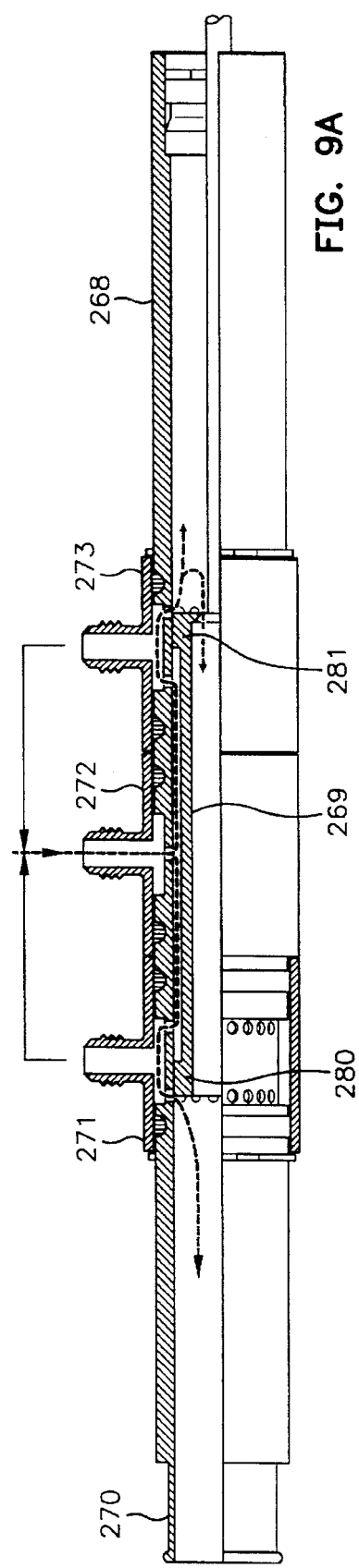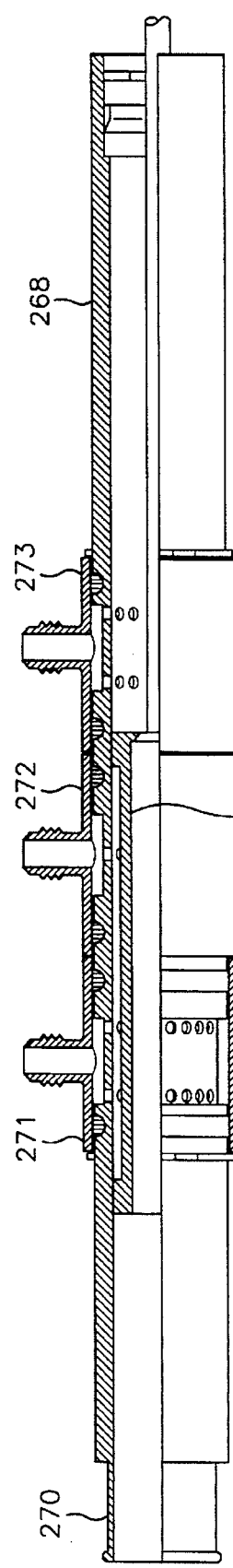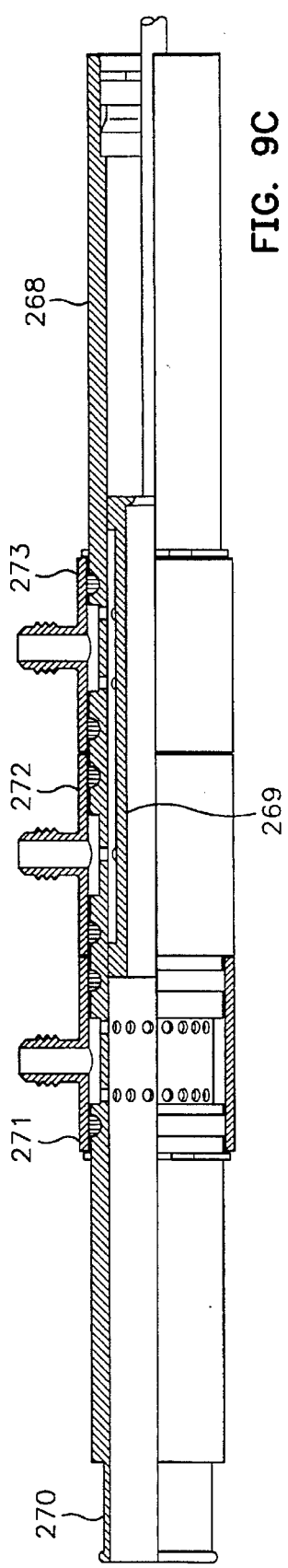

ROLL CORRECTION SYSTEM WITH COUNTERSTEER COMPENSATION

BACKGROUND OF THE INVENTION

This invention relates to roll correction for a vehicle, and more particularly to a roll correction system which levels a vehicle during a turn-induced roll while compensating for countersteer.

The background of the invention includes vehicles, such as automobiles, which have a body, a plurality of wheels, and a suspension connecting the body to the wheels.

When such a vehicle turns, the suspension permits the vehicle body to rotate about its longitudinal axis in response to a rolling force exerted on the body during the turn. Typically, the vehicle's passengers experience this effect as the tilt of the vehicle body, with the side of the body on the outside of the curve being relatively lower than the side of the body on the inside or the curve. Conventionally, this is referred to as "roll".

The inventor has invented mechanisms, apparatuses, and systems for correcting roll of a vehicle body. See, for example, U.S. Pat. Nos. 5,161,822; 5,174,603; and, 5,219,181, all of which are incorporated herein by reference.

In the incorporated patents, roll compensation (or, "tilt correction", in the patents) is provided by a valved hydraulic signal generator that produces a hydraulic signal conditioned to indicate a vehicle roll direction. The hydraulic signal is differentially generated, and includes pressurizing and return components. Cylinder and piston assemblies are mounted for roll correction at the wheels of the vehicle. Typically, a hydraulic circuit connected to the valved hydraulic signal generator and to the cylinder and piston assemblies conducts the differential hydraulic signal to the cylinder and piston assemblies. The hydraulic signal moves the pistons in the cylinder and piston assemblies in complementary directions on either side of the vehicle. The directions of piston movement counteract roll and thereby level a vehicle body during a turn.

In the prior art, the condition of the hydraulic signal precisely indicates the direction in which the vehicle is being steered. In most cases, the steering direction is the same as the direction in which the vehicle is turning ("the turning direction"). Likewise, it will be appreciated that since the vehicle rolls to the outside of a turn, the roll direction will be known from the turning direction.

In the incorporated patents, the hydraulic signal is conditioned in response to a steering direction of the vehicle. For example, in the incorporated '822 patent, the hydraulic signal source includes a valve with a cylinder within which a piston is disposed for longitudinal sliding movement. The piston is connected by mechanical linkage to an automobile steering assembly and is moved in one longitudinal direction or another with respect to the cylinder when the steering assembly is operated to turn the vehicle. Accordingly, the position to which the piston is moved indicates a steering direction of the automobile. Ports are longitudinally distributed along, and open into, the cylinder. The position of the piston configures hydraulic flow between the ports so that pressure and return potentials are provided to operate the cylinder and piston assemblies in order to correct for roll.

While the effectiveness of the roll correction technology invented by the inventor and described and claimed in the incorporated patents has been widely acknowledged, to date no provision has been made to correct for countersteer as might occur, for example, when a vehicle begins to slide while turning. In such a case, the operator would instinctively reverse the direction of the steering wheel toward the outside of the turn in order to regain control of the vehicle. Since, in the prior art system of the '822 patent, the hydraulic signal essentially indicates the steering direction such a countersteer condition would result in reversal of the sense of the hydraulic signal since the centrifugal force of the sliding vehicle maintains the roll to the outside of the turning direction, countersteer would cause an undesirable reversal in roll correction by applying elevation to the side of the vehicle on the inside of the turn. Since the inside edge is already elevated by centrifugal force of the turn, such correction exaggerates the roll condition.

Further, the inventor has determined that roll correction is unnecessary and perhaps undesirable at low vehicle speeds. However, because of the mechanical linkage between the valved hydraulic signal generator described in the '822 patent and vehicle steering assembly, tilt correction is introduced at any speed including low speeds when the suspension acts to level the vehicle in a turn.

Accordingly, there is a manifest need to compensate countersteering in the prior art roll correction systems exemplified in the incorporated patents, and there is a further need to bypass or disable roll correction altogether at low vehicle speeds.

SUMMARY OF THE INVENTION

This invention satisfies the omissions in the prior art technology by providing countersteer compensation and low speed "lockout" in a roll correction system. This invention is based upon the inventor's critical observation that a misleading steering indication can be detected during countersteer by sensing a roll condition and maintaining the condition of a hydraulic signal to indicate the roll direction even in the face of a reversal of the steering direction by operation of the steering assembly. The inventor has also critically observed that suppression of roll correction operation at low vehicle speeds is achieved by simply sensing the vehicle speed, comparing it with a predetermined speed threshold, and enabling the operation of the valve signal generator only when the vehicle speed exceeds the threshold.

An objective of the present invention is, therefore, to provide a system for roll correction in a vehicle while correcting the response of the system to countersteer.

Another objective is to provide a roll correction system whose operation is enabled only when vehicle speed exceeds a predetermined threshold.

These and other objects and advantages of the invention will become apparent from the following detailed description when read with reference to the accompanying drawings, which illustrate a preferred embodiment and best mode of the invention by way of example.

BRIEF DESCRIPTION OF THE DRAWINGS

FIGS. 7A–7C are side sectional views of the valved hydraulic signal source of FIG. 6;

FIG. 7D shows an enlarged detail in the piston of FIG. 6;

FIG. 8 is an alternate embodiment of a valved hydraulic signal source used in the invention;

FIGS. 9A–9C are side sectional views of the valved hydraulic signal source of FIG. 8.

DETAILED DESCRIPTION OF THE PREFERRED EMBODIMENT

Figure 1:
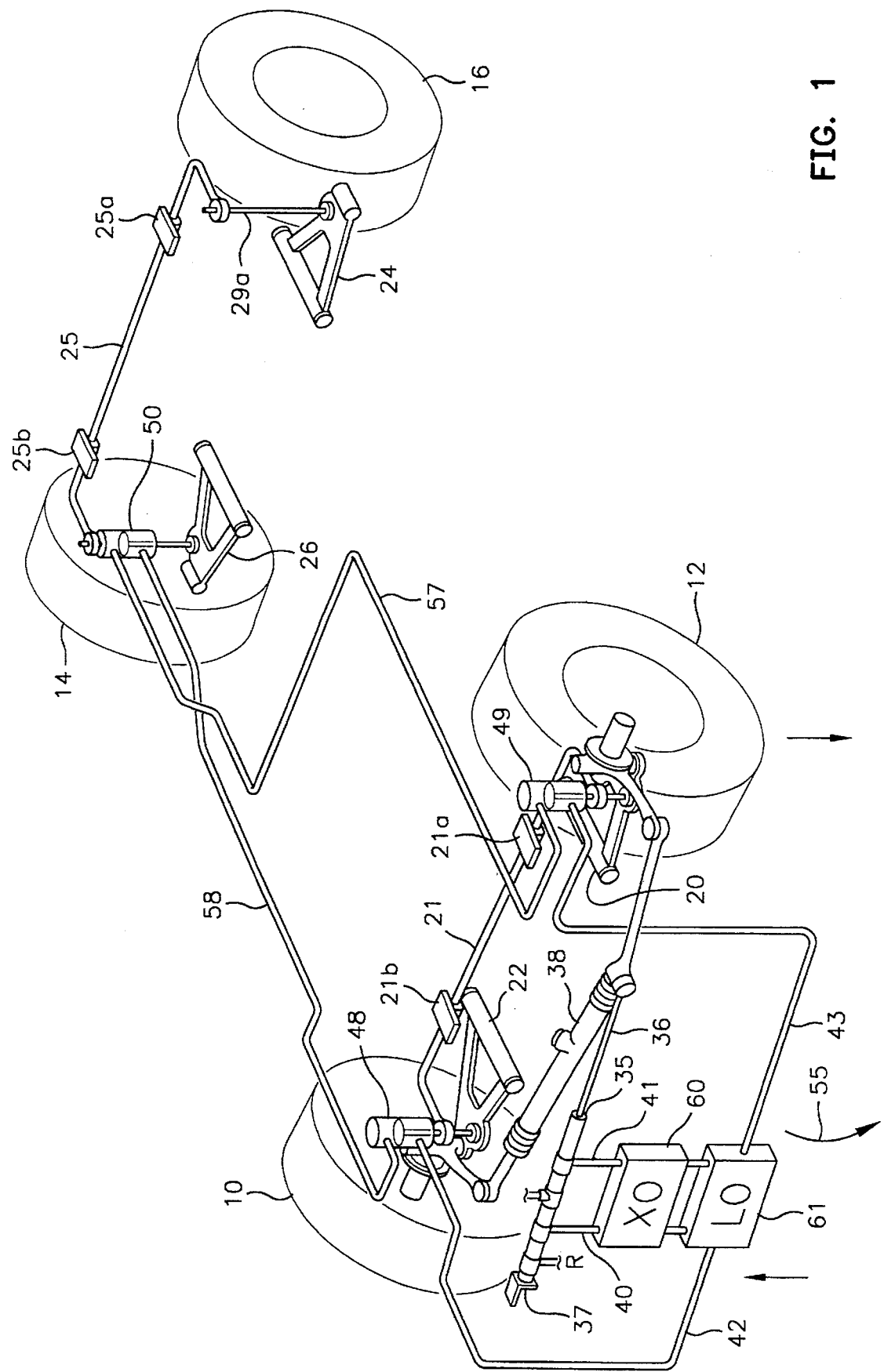
FIG. 1 is a three-dimensional representation of the preferred embodiment of the invention in an operational environment.

Referring to FIG. 1, an illustration of a partial representation of an automobile showing an arrangement of parts according to the invention, a vehicle, such as an automobile, includes a pair of front wheels 10 and 12, and a pair of rear wheels 14 and 16. In the vehicle, a set of suspension components 20, 21, and 22 are connected to axles that mount the front wheels 10 and 12, while axles that mount the rear wheels are connected to suspension components 24, 25, and 26.

The front wheel suspension components include a first "A" (or lower control) arm 20 connected by a cylinder and piston assembly 49 to one end of an anti-roll bar 21. The anti-roll bar 21 is anchored at 21a and 21b to a body (not shown) of the vehicle and is connected through a cylinder and piston assembly 48 to another "A" arm 22. The wheels 10 and 12 are conventionally mounted on the A arms, 22 and 20 respectively.

At the rear of the vehicle, the suspension component 24 includes an "A" arm rotatably connecting the rear wheel 16 to the vehicle body. The suspension component 26 similarly includes an A arm rotatably connecting the rear wheel 14 to the vehicle body. An anti-roll bar 25 is conventionally linked by linkage 29a to the A arm 24. The anti-roll bar 25 is secured to the vehicle body at 25a and 25b. The other end of the anti-roll bar 25 is connected to the A arm 26 by a cylinder and piston assembly 50.

A hydraulic fluid signal source 35 provides a hydraulic signal indicative of a steering direction. The hydraulic fluid signal source operates in response to pressurized hydraulic fluid having complementary pressurizing (P) and return (R) components. These complementary hydraulic signal components are introduced into the hydraulic fluid signal source 35 through ports referenced as P and R, respectively. The hydraulic fluid signal source 35 operates essentially as the identically-numbered element in the incorporated '822 patent. In this regard, the hydraulic fluid signal source 35 includes a cylinder and a piston that is slidably disposed within the cylinder for movement along the longitudinal axis of the cylinder. One end of the piston is connected by rod 36 to the vehicle steering assembly that includes part 38. The cylinder of the hydraulic fluid signal source 35 is fixedly attached by bracket 37 to the frame (not shown) of the vehicle.

As with the identically-numbered element of the incorporated '822 patent, the hydraulic fluid signal source 35 couples the pressurizing and return potentials through ports 40 and 41 according to the direction in which the vehicle is steered, as determined by how the steering mechanism 38 positions the piston of the hydraulic fluid signal source 35. Thus, for a rotation of the steering mechanism in one direction, the components P and R may be coupled through the ports 40 and 41, respectively, and may be coupled through the ports 41, 40, respectively, when the vehicle is steered in the opposite direction. In order to introduce roll correction in response to steering the vehicle, the hydraulic conductors 42 and 43 conduct the complementary components of the hydraulic fluid signal to the cylinder and piston assemblies, 48, 49, and 50. Thus, for a turn in the left direction as indicated by the arrow 55, the body of the vehicle would roll toward the right-hand side of the vehicle. In order to correct for the rotational displacement of the roll, the return potential would be provided through the hydraulic conductor 42 to the bottom of the cylinder and piston assembly 48, causing that assembly to expand. Expansion of the cylinder and piston assembly 48 draws hydraulic fluid through hydraulic 58 from the bottom of the piston in the cylinder and piston assembly 50, causing that assembly to expand. Expansion of the cylinder and piston assemblies 48 and 50 provides an erecting force to the right-hand side of the vehicle body, thereby correcting for the rotation of the body to the outside of the turn to the left. At the same time that the return potential is conducted in the hydraulic conductor 42, the pressurizing potential is provided in the hydraulic conductor 43 pressurizing the bottom of the piston in the cylinder and piston assembly 49, thereby pulling the left-hand side of the vehicle body toward the suspension. The return potential is provided to the top of the piston in the piston in the and cylinder assembly through hydraulic conductor 57. This action of the cylinder and piston assembly 49 complements the actions of the cylinder and piston assemblies 48 and 50.

Those skilled in the art will realize that roll correction as just described may use more, or fewer, cylinder and piston assemblies than the three shown in FIG. 1.

In the invention, assume that during the left-hand turn just described the vehicle begins to skid toward the outside of the turn-that is, toward the right. According to the rules of good driving practice, the driver would then reverse the steering direction ("countersteer"), turning the wheels to the right in an attempt to regain control of the vehicle. In this case, without the benefit of the invention, the reversal of the steering direction would reverse the condition of the hydraulic signal provided by the hydraulic fluid signal source 35, providing the pressurizing potential to the hydraulic conductor 42 and the return potential through the hydraulic signal conductor 43. This would reverse the roll correction just described and would amplify the rotation of the body to the outside of the turn, thereby exaggerating the roll condition.

In order to detect and prevent countersteering from interfering with roll correction, the inventor has provided a novel valve assembly, referred to herein as a "crossover" (XO) valve assembly which is indicated by reference numeral 60 in FIG. 1. The crossover valve assembly 60 responds to detection of countersteer by maintaining the correct condition of the complementary hydraulic signal during a turn. In this regard, the crossover valve assembly 60 accounts for the reversal of the condition of the complementary hydraulic signal that the hydraulic fluid signal source 35 would cause in response to countersteer. When countersteer is detected, the crossover control valve assembly "crosses over" or reverses the condition of the hydraulic signal provided through the ports 40 and 41, thereby maintaining the correct condition of the hydraulic signal to indicate the roll direction. Thus, for example, at the beginning of the left-hand turn described above, without countersteer, the crossover valve assembly 60 would pass through the hydraulic signal with the return potential coupled through the valve assembly 60 from the port 40 to hydraulic signal conductor 42 and with the pressurizing potential coupled from the port 41 to the hydraulic signal conductor 43. Next, in response to countersteer, when the pressurizing potential would be provided through the port 40 and the return potential through the port 41, the crossover control valve assembly 60 is configured to "crossover" those potentials so that the return potential is coupled from the port 41 to the hydraulic signal conductor 42 and the pressurizing potential from the port 40 to the hydraulic signal conductor 43.

Figure 2:
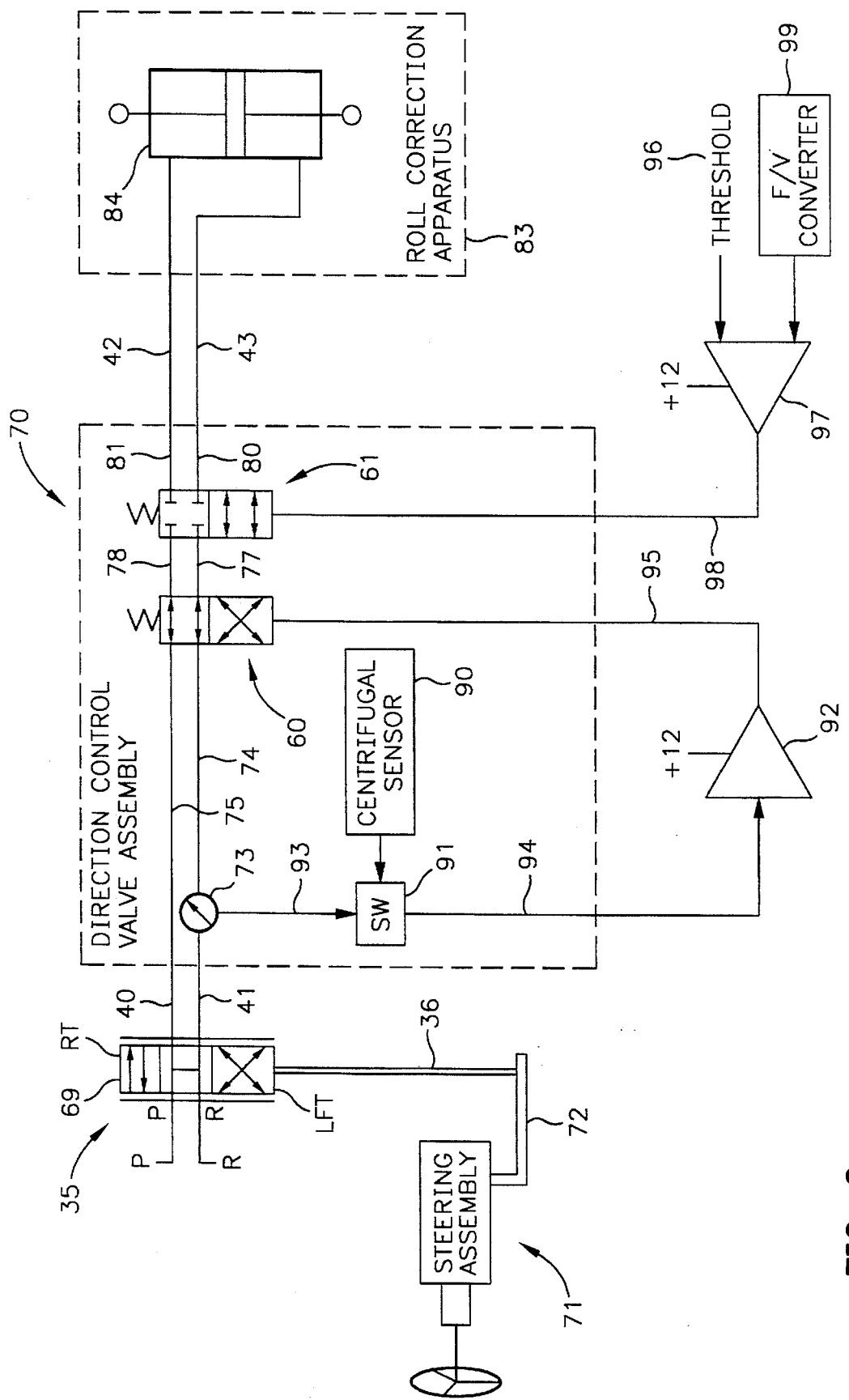
FIG. 2 is a combined electrical and hydraulic schematic of the roll correction system showing system operation with crossover and lock-out functions.

Refer now to FIG. 2 for an understanding of the operation of a roll correction system with countersteer compensation provided as a function of the crossover valve assembly 60. In FIG. 2, the valved hydraulic signal source 35 receives pressurizing and return potentials from, for example, a hydraulic pump mechanism (not shown). The valved hydraulic signal source 35 includes the input ports P and R and the output ports 40 and 41. The valved hydraulic signal source 35 is shown in schematic in FIG. 2 with three sections that are found generally in the top third, middle third, and lower third of the rectangular outline 69. The middle third of the rectangular outline represents the neutral position of the valved hydraulic signal source at which the P potential is returned to the R potential in the source 35. The top third of the representation with the oppositely-directed arrows represents the configuration of the source in response to steering the vehicle in a first direction where the P potential is coupled to the port 40 and the R potential to the port 41. The bottom third of the representation represents steering the vehicle in the opposite direction, in response to which the source 35 couples the P potential to the port 41 and the R potential to the port 40. The steering assembly 71 of the vehicle is coupled to the piston shaft 36 by a conventional coupling such as a Pitman arm 72.

The crossover valve assembly 60 is located, together with the lockout valve assembly 61, in an integrated direction control valve assembly 70 that also includes a hydraulic pressure sensor 73 disposed in a hydraulic chamber of the assembly 70 that is coupled to the port 41 of the valved hydraulic fluid signal source 35. Another hydraulic conductor 75 couples the port 40 to the crossover valve assembly 60. The crossover valve assembly is hydraulically connected at 77 and 78 to the lock-out valve assembly 61. The lock-out valve assembly is hydraulically connected at 80 and 81 to a roll correction mechanism 83 that includes cylinder and piston assemblies such as are shown in FIG. 1. One such roll correction cylinder and piston assembly is indicated by reference numeral 84 in FIG. 2.

Both the crossover and lock-out valve assemblies 60 and 61 are solenoid driven devices; both of the valve assemblies are multi-way, two-position devices. In its default position, the crossover valve assembly 60 passes the hydraulic potentials of the hydraulic fluid signal in the hydraulic conductors 74 and 75, without inversion, to the lock-out valve assembly 61. This is indicated by the parallel double-ended arrows in the schematic representation of the crossover valve assembly 60. Upon detection of a countersteer condition, the solenoid of the valve assembly 60 is activated, which cross-connects or crosses over the potentials in the hydraulic conductors 74 and 75, thereby maintaining the correct condition of the hydraulic signal for roll correction.

The lock-out valve assembly 61, in response to vehicle speed, either disables or enables the hydraulic channels that couple through the crossover/lockout valve assembly 70 to the roll correction cylinder and piston assemblies. In this regard, FIG. 2 shows the lock-out valve assembly 61 at its default position when the solenoid is not activated. At this position, hydraulic flow through the crossover/lockout valve assembly 70 is disabled. When the vehicle exceeds a threshold speed, the solenoid of the lock-out valve assembly 61 is activated, reconfiguring the lock-out valve assembly so that it enables the hydraulic circuit through the crossover/lockout valve assembly 70, and couples the hydraulic signal through the assembly 70 to the roll correction apparatus 83.

Figure 3:
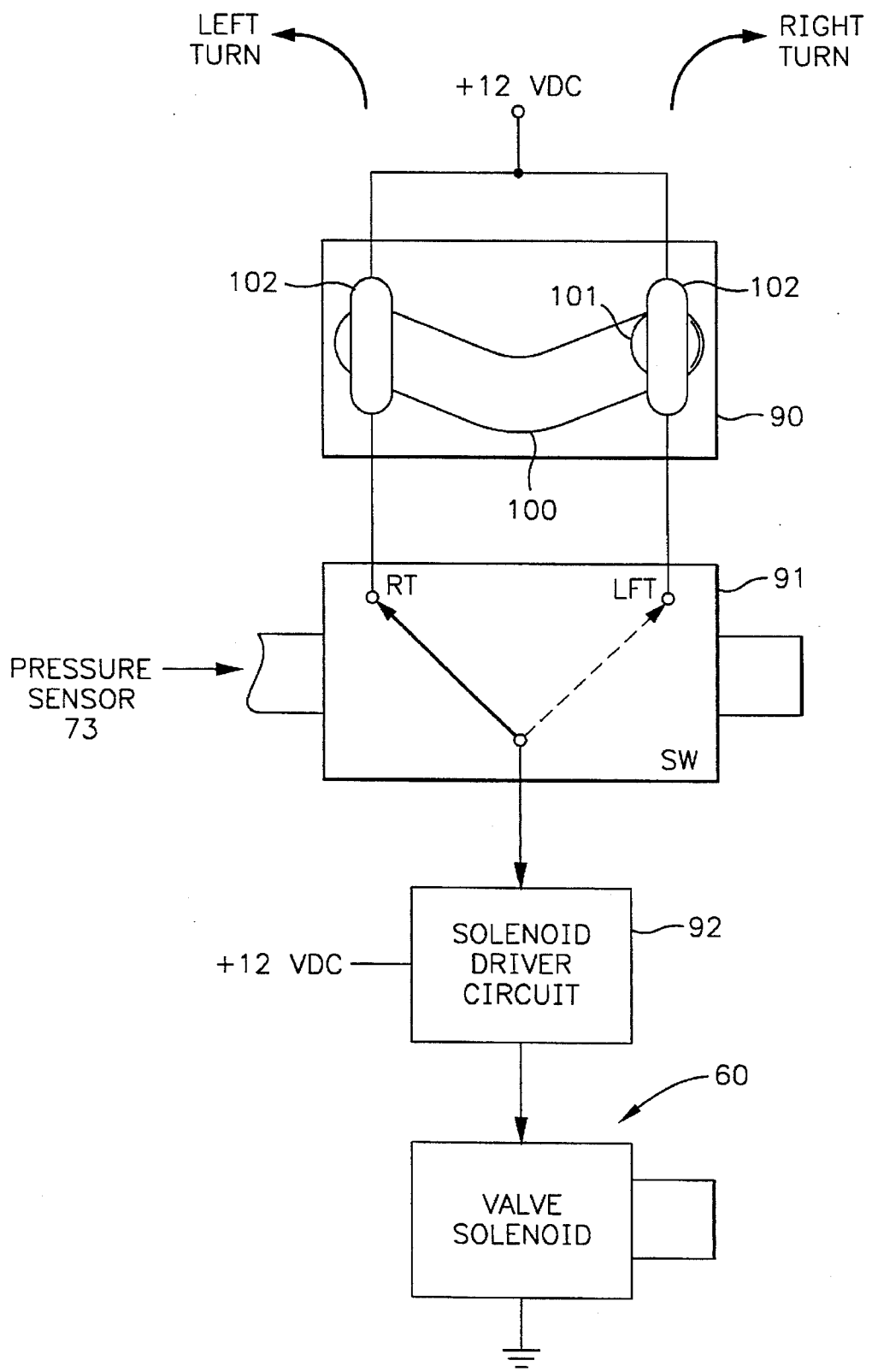
FIG. 3 is an electronic schematic diagram showing the structure and operation of crossover and lock-out electronics.
Figure 4:
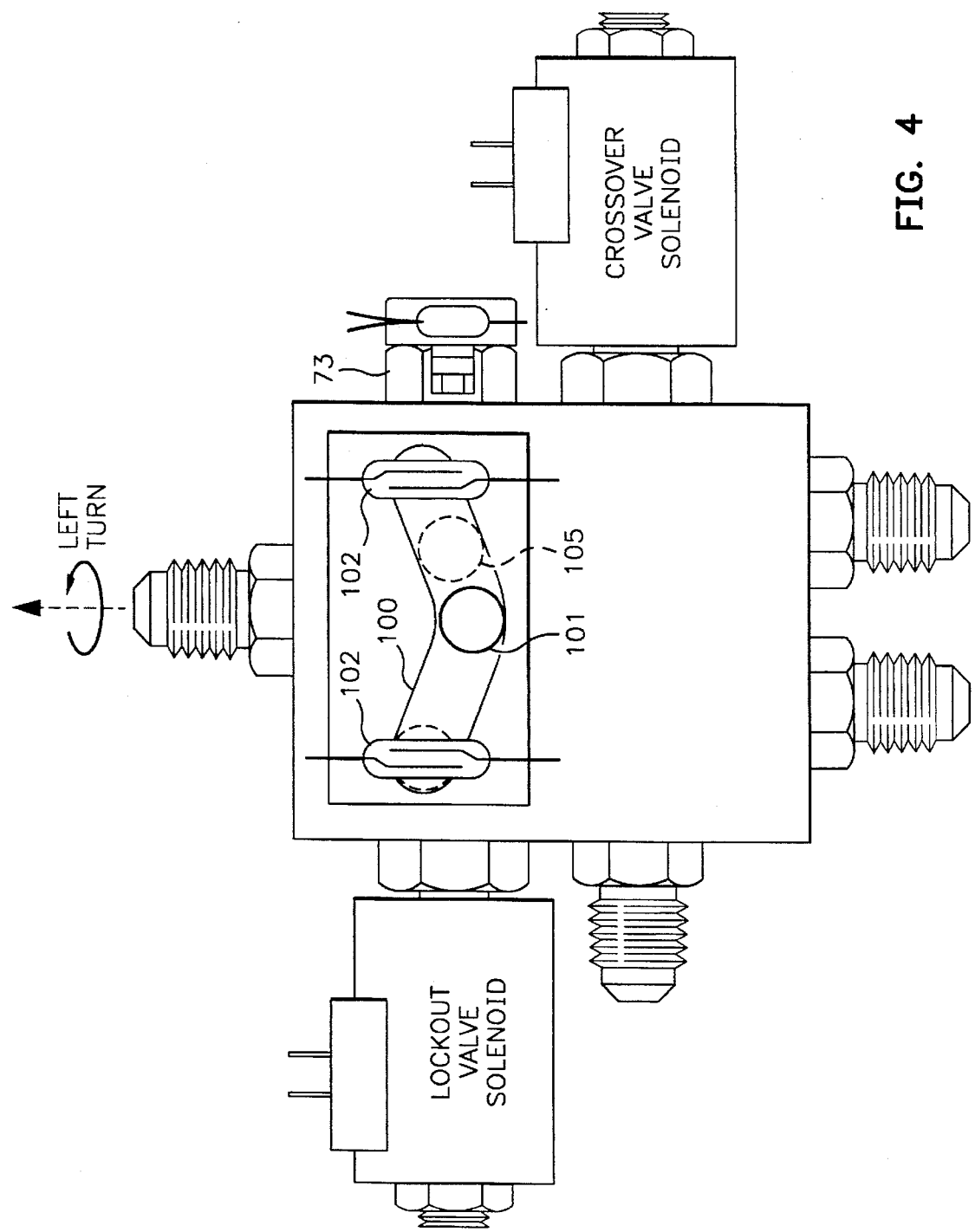
FIG. 4 is a rear elevation view of a crossover/lockout valve assembly that combines crossover valving, lock-out valving, and turn direction sensing functions.

Refer now to FIGS. 2, 3, and 4 for an understanding of the control mechanization that manages the position of the solenoid of the crossover valve assembly 60. Electric control is provided by a centrifugal sensor that senses centrifugal displacement of the vehicle as would be induced by, for example, a turn. The centrifugal sensor 90 is connected to a single pole, double throw switch (SW) 91 whose position is determined by the state of a signal provided by the pressure sensor 73 that senses pressure in the hydraulic channel 74 of the crossover/lockout valve assembly 70 in practice, the switch 91 is integral with the sensor 73, and is provided with the sensor as a single unit. The switch 91 is shown separately in FIGS. 2 and 3 for purposes of illustration only. In operation, the pressure sensor 73 conditions an output electrical signal on an electrical signal conductor 93. The electrical signal is provided in a first state if the return potential is present in the hydraulic conductor 74 and is conditioned to a second state if the pressurizing potential is present in the hydraulic conductor 74. The output of the switch 91 is provided on an electric signal conductor 94 to an amplifier 92. Under normal turning conditions with no countersteer, the electrical signal output by the switch 91 has a first condition that causes the amplifier 92 to maintain high impedance over electrical signal conductor 95 on the input solenoid of the crossover valve assembly 60 which keeps the assembly set to couple the hydraulic potential on the hydraulic channel 74 and 75 to the corresponding channels 77 and 78, respectively, without inverting them. When the electrical signal output at 94 by the switch 91 is conditioned to a second state indicating a crossover condition, the amplifier 92 applies an actuating electrical current to the solenoid of the crossover valve assembly 60, thereby placing the assembly 60 in the crossover state.

A frequency to voltage (F/V) converter 99 converts the speed of the vehicle to a voltage level that is compared against a threshold voltage 96 by a comparator 97. The threshold voltage 96 corresponds to a predetermined lock-out speed for the vehicle, below which the lock-out valve assembly 61 assumes a first state keeping the hydraulic signal from being coupled through the crossover/lockout valve assembly 70 to the roll correction apparatus 85. This state of the solenoid is maintained by a first state of an electrical signal on an electrical signal conductor 98 that is output by the comparator/amplifier 97. When the speed of the vehicle exceeds the threshold, the output of the comparator/amplifier 97 provides an actuating electrical current on the electrical signal line 98, thereby activating the solenoid of the lock-out valve assembly 61, which causes the lock-out valve assembly to assume a second state in which the hydraulic signal is coupled through the control/lockout valve assembly 70 to the roll correction apparatus 83.

Refer now to FIGS. 3 and 4 for an understanding of the operation of the electro-mechanical and electronic components that control the state of the solenoid in the crossover valve assembly 60. In this regard, the structure of the crossover/lockout valve assembly 70 includes a rectangular enclosure, in a rear surface of which the centrifugal sensor 90 is supported. The centrifugal sensor consists of a widely opened V groove 100 within which a cylindrical magnet 101 is rollably disposed. Reed switches 102 are disposed over respective ends of the V-shaped groove 100. Those skilled in the art will realize that other magnetic field detectors such as Hall effect switches may be used in place of the reed switches 102. The groove is cut deeply enough that the cylindrical magnet 101 is able to roll completely under either of the reed switches 102, depending upon the attitude of the centrifugal sensor 90. When the cylindrical magnet 101 rolls under either of the reed switches 102, magnetic fields of the cylindrical magnet 101 brings the contacts of the switch together, thereby providing an electrical pathway through the switch. When the cylindrical magnet 101 rolls out from under the switch, its contacts separate, thereby opening the electrical signal path.

The assembly 70 is preferably formed from a non-magnetic material such as aluminum. The cylindrical magnetic is retained in the groove 100 by a non-magnetic cover (not shown).

In the preferred embodiment and best mode of the invention, the enclosure of the crossover/lockout valve assembly 70 is mounted on the frame of the vehicle so that it is essentially upright and perpendicular to the surface on which the vehicle rests. Preferably, the centrifugal sensor is in a plane that is perpendicular to the longitudinal axis of the vehicle, with the left and right ends of the groove aligned perpendicularly to the left and right sides of the vehicle, respectively. When the vehicle is in motion, if the motion is substantially straight, gravity retains the cylindrical magnet 101 essentially in the center of the V-shaped groove 100. When the vehicle turns in one direction or another, the inertia of the cylindrical magnet 101 tends to roll it in the direction opposite the turn. Of course, this is the same direction in which the body rolls. Thus, with respect to FIG. 4, assuming that the crossover/lockout valve assembly housing is oriented with respect to the vehicle as described above and assuming a turn to the left as indicated by the arrow marked TURN, the cylindrical magnet 101 will roll to the right to and through the dotted line location indicated by 105. As the vehicle assumes a straight ahead trajectory, gravity returns the cylindrical magnet 101 to the position indicated by the solid circular outline of FIG. 4.

Refer now to FIG. 3 for an understanding of how the centrifugal sensor 90 and pressure sensor 73 detect and react to a countersteer condition. In FIG. 3, the cylindrical magnet 101 rolls in the V-shaped track 100 to activate one of the switches 102. The switch 91 indicates which of the hydraulic channels 74 and 75 is conducting the pressurizing potential. The amplifier circuit 92 receives and amplifies the output of the switch 91 to drive the solenoid of the crossover valve assembly 60.

The combination of the centrifugal sensor 90 and the switch 91 detects a countersteer condition such as would occur as described above where a vehicle begins to skid while turning. In this case, the actual vehicle movement does not follow the steering assembly position. When these anomalous circumstances are detected, the condition of the hydraulic signal comprising the respective hydraulic components flowing in the hydraulic conductor 74 and 75 is reversed.

For an understanding of the operation of the electrical circuit illustrated in FIG. 3, assume that design configurations require that the pressurizing potential is provided to the outside edge of the vehicle with respect to the turn. Therefore, in a right turn, pressurizing potential would be provided to the left side of the vehicle and, in a left turn, to the right side of the vehicle. Now, assume that the vehicle is traveling at a speed above the lock-out speed and that it turns left as shown in FIG. 4. In this case, the cylindrical magnetic 101 rolls to the right, closing the switch 102 on the right-hand side of the centrifugal sensor 90. With a left turn and no countersteer, the pressurizing potential should be provided to the righthand side of the vehicle through the hydraulic path 75, 60, 78, 61, 81, and 42. Since there is no countersteer, the pressure sensor 73 provides a signal indicating the return potential in the hydraulic channel 74 closing the pressure switch to the position shown in FIG. 3 which corresponds with the pressurizing potential flowing to the right side of the vehicle. Next, assume that the car begins to skid during the left turn and that the driver reverses the steering direction by turning the steering wheel to the right. In this case, the cylindrical magnet stays on the right-hand side of the centrifugal sensor 90, but the reversal of steering direction reverses the condition of the hydraulic signal provided by the valve source 35, thereby pressurizing the hydraulic channel 74. Upon detecting a pressurizing potential in the hydraulic channel 74, the pressure switch 73 reverses its state, causing the switch 91 to invert its state and close the circuit with a pole that corresponds to pressurization of the left side of the vehicle. This is shown in FIG. 3 by the dotted line in the switch 91. In this case, there is now a complete electric circuit in the centrifugal sensor 90 through the switch 91 that conducts the activating current signal through the amplifier 92 to the solenoid of the crossover valve assembly 60, thereby reversing the pressurizing and return potentials at the output of the crossover/lockout valve assembly 70. This maintains the pressurizing potential on the right side of the vehicle and the return potential on the left side, thereby maintaining the correct condition of the hydraulic signal to indicate the roll direction of the vehicle.

The just-described scenario reverses itself if the assumption is made that the vehicle is turned to the right.

Figure 5:
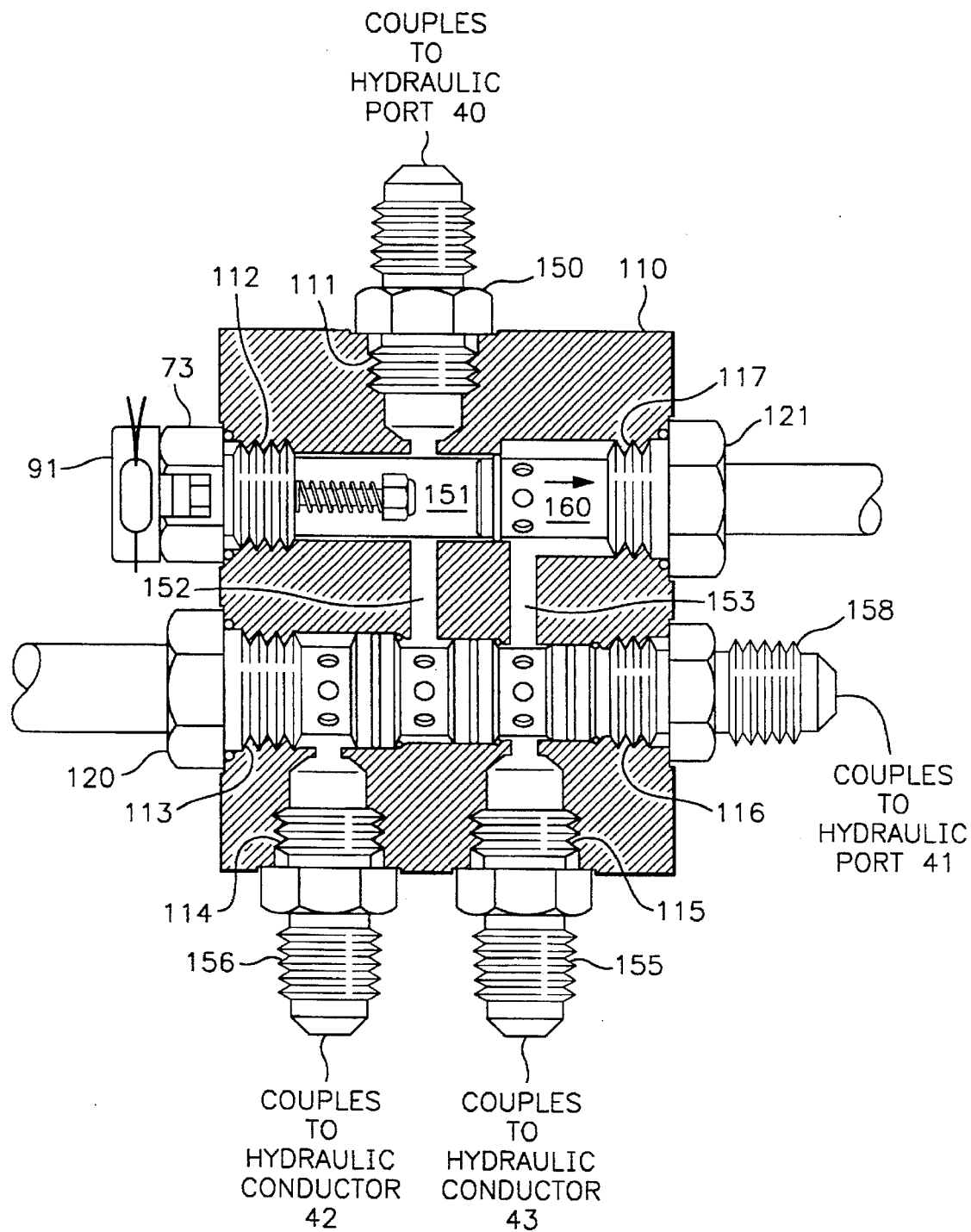
FIG. 5 is a sectional view of the control valve assembly from the front of the assembly in the direction of the rear surface shown in FIG. 4, showing control valve assembly components and a hydraulic flow control structure.

The construction and operation of the best mode of the crossover/lockout valve assembly can be understood with reference to FIGS. 4 and 5. FIG. 4 shows the integrated assembly 70 in a rear elevation view, while FIG. 5 shows the crossover/lockout valve assembly in cross-section at a plane parallel to the front of the assembly, with the view from the front. As shown, the crossover/lockout valve assembly includes a machined rectangular block of non-magnetic material 110 with seven threaded recesses 111–117 that open into channels within the block 110. Standard hydraulic connectors are threaded into the inlets 111, 114, 115, and 116. The pressure sensor 73 is threaded into the port 112. A standard four-way, two-position solenoid-driven valve 120 is threaded into the port 113. A standard two-way, two position solenoid-driven valve 121 is threaded into the port 117. The crossover valve assembly is implemented by the four-way, two position valve 120, while the lock-out valve assembly is implemented by the two-way, two position valve 121.

In FIG. 5, the hydraulic connector 150 couples the hydraulic potential in the hydraulic conductor 40 into a chamber 151 into which the inlets 111,112, and 117 open, as do two hydraulic channels 152 and 153. The channel 152 couples into one of the ways of the four-way valve 120. Another of the ways of the four-way valve 120 is accessed by the hydraulic channel 153 and, through the hydraulic connector 155, by the hydraulic channel 43. A third way of the four-way valve 120 is accessed by the hydraulic channel 42 through the hydraulic connector 156. The fourth way of the four-way valve 120 is accessed by the hydraulic channel 41 through the hydraulic connector 158.

Lock-out valve operations are implemented by the valve 121. In the first state, shown in FIG. 5, the valve 121 couples the hydraulic channel 153 to the chamber 151. In this position, the potential in the chamber 151 is provided to the second and third ways of the valve 120, thereby coupling the potential in the port 40 to the potential of port 41 in the valve 120. This disables crossover operation and roll correction. Above lockout speed, the moveable portion of the valve 121 is moved in the direction of the arrow 160, thereby blocking hydraulic flow between chamber 151 and channel 153 and decoupling the potential at port 40 from the third way of the valve 120. This effectively "separates" the complementary potentials of the differential hydraulic signal between the ports 40 and 41, thereby enabling operation of the crossover valve assembly and roll correction.

The valve 120 that implements the crossover valve assembly operates conventionally to connect the potential of the second way provided from the hydraulic channel 40 via the paths 150, 151, 152 to one of the first and third ways, depending upon the position of the valve's solenoid. Similarly, the hydraulic potential in the hydraulic channel 41 is coupled through the fourth way via the hydraulic connector 158 to the third or the first way according to the position of the solenoid of the valve 120. Assuming the position of the lockout valve 121 illustrated in FIG. 5, the operation of the four-way valve 120 provides the crossover valve operation described above.

Figure 6:
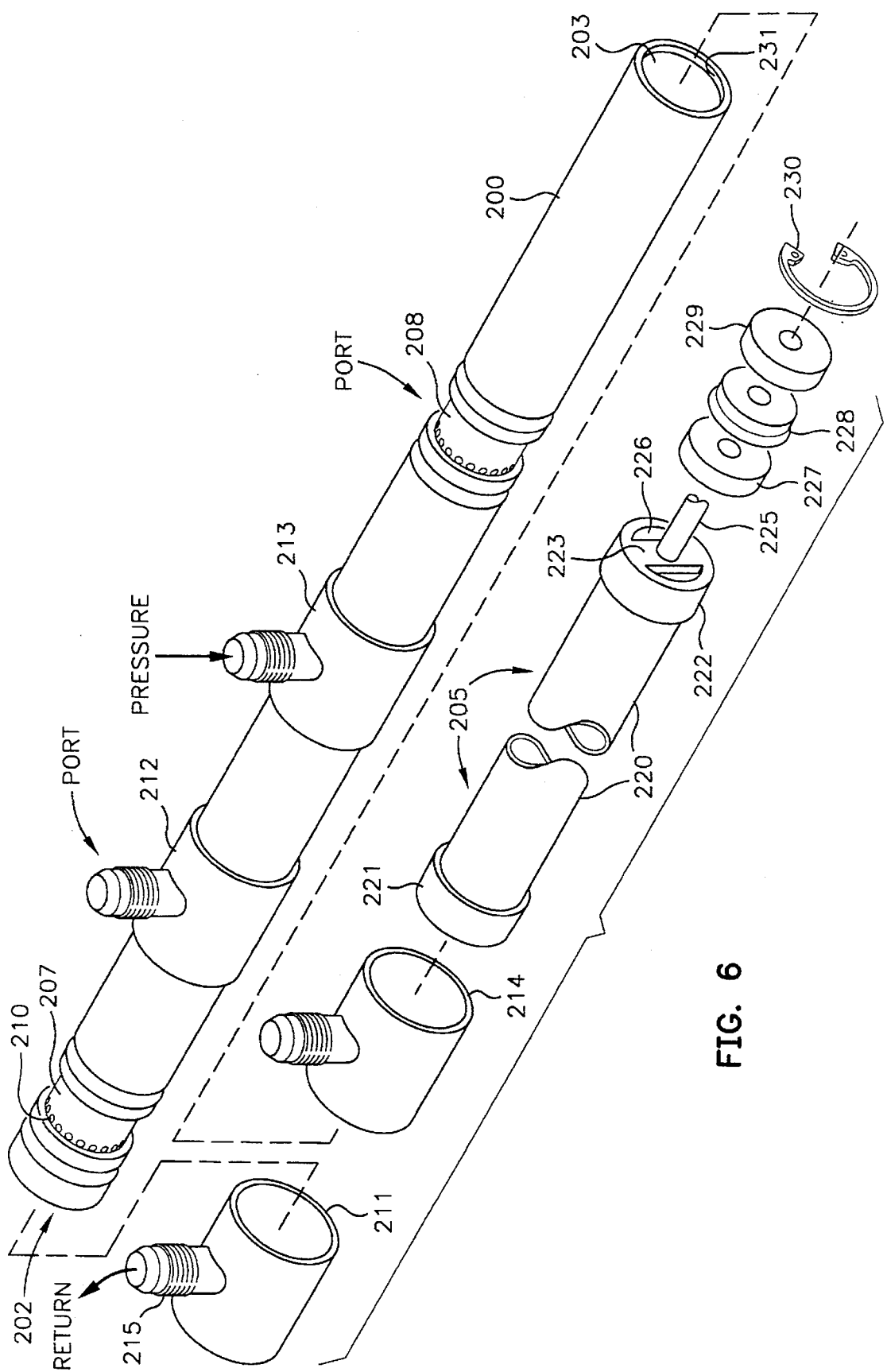
FIG. 6 is a partially exploded assembly drawing of a valved hydraulic signal source.

FIGS. 6 and 8 illustrate, respectively, embodiments of the valved hydraulic signal source 3,5. FIGS. 7A–7C and FIGS. 9A–9C are side sections of the embodiments shown in FIGS. 6 and 8, respectively, and illustrate operations of the embodiments in response to vehicle steering. FIG. 7 illustrates an important feature of a piston in the embodiments.

The first embodiment, illustrated in FIGS. 6 and 7A–7C includes an elongate hollow cylinder 200 closed at a first end 202 and having an opening at a second end 203 wherein a piston 205 is inserted for longitudinal sliding movement within the cylinder 200. The outer surface of the cylinder 200 is configured with four circumferential grooves, two of which are indicated by reference numerals 207 and 208. All of the grooves are similarly configured and the following explanation of the groove 207 substantially describes the remaining three grooves. The groove 207 includes a circumferential array of apertures 210 that open into the interior of the cylinder 200 in the space where the piston 205 slides. When the first embodiment of the valve hydraulic signal source shown in FIG. 6 is assembled, each of the circumferential grooves is covered by a respective one of four ported collars 211,212, 213, and 214. Each of the ported collars includes a cylindrical section having an interior diameter only slightly larger than the exterior diameter of the cylinder 200. Each of the ported collars includes a conventional hydraulic connector, such as the hydraulic connector 215 on the ported collar 211. Each of the ported collars 211,212, 213, and 214 is positioned over a respective one of the circumferential grooves and is sealed to the outside surface of the cylinder 200 on either side of the respective groove. Such sealing can be, for example, by O-rings or by soldering. Thus, each cylindrical groove/ported collar combination provides a hydraulic port. As FIG. 6 illustrates, there are four ports, distributed longitudinally along the cylinder 200.

The piston 205 includes a hollow elongate cylindrical section 220 at each end of which are annular collars 221 and 222. The ends of the piston are open. Each of the annular collars 221 and 222 is dimensioned to provide a sliding hydraulic seal with the interior surface of the cylinder 200. Further, the annular collar 222 is configured essentially as a cap that fits over its respective end of the piston 205. The annular collar 222 has an end portion structure including openings 226 and a solid cross piece 223 on which an end of a piston rod 225 is connected. The piston rod 225 extends outwardly through the open end 203 for connection to the steering assembly. The open end 203 is hydraulically sealed by the end seals 227, 228, and 229, which have central apertures through which the piston rod 225 extends. The end seals 227, 228, and 229 are retained within the cylinder 200 by a retaining ring 230 that fits in the interior circumferential groove 231 at the end 203.

Further construction details of the first embodiment valved hydraulic signal source are shown in FIGS. 7A–7D. In these figures, the four ports of the valved hydraulic signal source are denoted by the reference numerals that identify the ported collars at those ports. Thus, it can be seen that at each port a pair of O-rings maintains a hydraulic seal between the interior and exterior of the cylinder 200. Two such rings, 240 and 241, are shown at the port 211. Further, the end seals 227, 228, and 229 are retained in the open end 203 of the cylinder 202 between the retaining ring 230 and a shoulder 243. The circumferential groove at each of the ports 211,212, 213, and 214 has either one or two annular arrays of apertures. At the port 211, there is a single array of apertures, 210 that are aligned with edge of the circumferential groove 207 nearest the closed end 202. In the port 212, there are two circumferential arrays of apertures, one at either edge of the circumferential groove at the port 212. At the port 213, there is a single circumferential array of apertures centered in the circumferential groove at the port 213. The port 214 includes two circumferential arrays of apertures disposed at either edge of the circumferential groove 208. The annular end pieces 211 and 222 are each of a width that is slightly less than the distance between the two circumferential arrays of apertures at the ports 212 and 214, thereby providing a fluid path around the ends of the annular end pieces through the circumferential grooves at the ports 212 and 214. Finally, the pressurizing potential is applied through the port 213 and the return potential through the port 211.

Now, turning to the operation of the valved hydraulic signal source first embodiment, FIG. 7A illustrates the source in its neutral configuration as would be assumed when a vehicle is traveling, for example, forward or in reverse, without turning. In this position, the pressurizing potential applied through the port 213 is coupled within the valved hydraulic signal source, to the return port 211 along the outer surface of the piston 205, around the annular collars 221 and 222. The return path around the right-hand end of the annular collar 222 is through the apertures 226 that open into the interior of the piston 205, and then through its open end at the annular collar 221. In addition, only the pressurizing potential is provided at the output ports 212 and 214. Without the complementary return potential provided through either of those ports, the hydraulic signal is undifferentiated and, therefore, does not operate the roll correction apparatus.

In FIG. 7B, the steering assembly has been rotated in a first direction, with the movement of the steering assembly coupled to the piston 205 by the piston rod 225. In this case, the annular collars 221 and 222 confine the pressurizing potential to a path along the outer surface of the piston 205 between the ports 213 and 212. The return potential is coupled through the port 211, the open end of the piston at the annular collar 221 and the interior of the piston 205, and the openings 226 to the port 214. In FIG. 7C, the steering mechanism has been rotated in a direction opposite that of FIG. 7B. In this position, the pressurizing potential is confined to the outer surface of the cylinder 205, reaching from the port 213 out through the port 214. Since the piston has moved its inner end, ringed by the annular collar 221 to a position between ports 212 and 213, there is an open hydraulic path through which the return potential is coupled between the ports 211 and 212. The return potential does reach through the interior of the piston 205, but cannot return along the outside of the piston through either of the ports 213 and 214.

FIG. 7D shows an enlarged schematic representation of the ends of the piston 205 to which the annular collars 221 and 222 are fitted. As shown, the outer surfaces 250 and 251 of the annular collars 221 and 222 have tapered portions 253 and 254 that extend from a portion of constant radius downwardly toward the outer surface of the piston 205. These tapered portions continuously vary the hydraulic flow when the annular collars traverse into the circumferential groove of a port thereby removing a "thud" or "bump" that may be heard and/or felt throughout the hydraulic system. The beneficial effect of these tapered portions is to provide a smoother, continuous operation of the roll correction apparatus.

Refer now to FIGS. 8 and 9A-9C for an understanding of the second embodiment of the valved hydraulic signal source. As these figures show, the second embodiment includes a cylinder 268 and a piston 269 each constructed substantially in the same way as the corresponding parts illustrated in FIGS. 6 and 7A-7D. The essential difference is that the second embodiment has one port 270 formed in one end of the cylinder 268 and three ports 271, 272, and 273 distributed longitudinally along the cylinder 268. As FIGS. 9A-9C illustrate, the end port 270 is coupled to the return potential, while the port 272 is coupled to the pressurizing potential. In FIG. 9A illustrating the neutral position of the source, return and source potentials are coupled within the source by hydraulic flow around the annular end pieces 280 and 281 of the piston 269. In FIG. 9B, the pressurizing potential is conducted along the outer surface of the piston 269 from the port 272 to the port 271, while the return potential is coupled between the end port 270 and the port 273 through the interior of the piston 269. In FIG. 9C, the steering assembly has been rotated in a direction opposite that represented in FIG. 9B, moving the piston 269 so that it conducts the pressurizing potential along its outer surface between the ports 272 and 273. At this position, the annular end piece 280 is positioned between the ports 271 and 272, thereby providing a hydraulic connection for the return potential between the ports 271 and 270.

Figure 10:
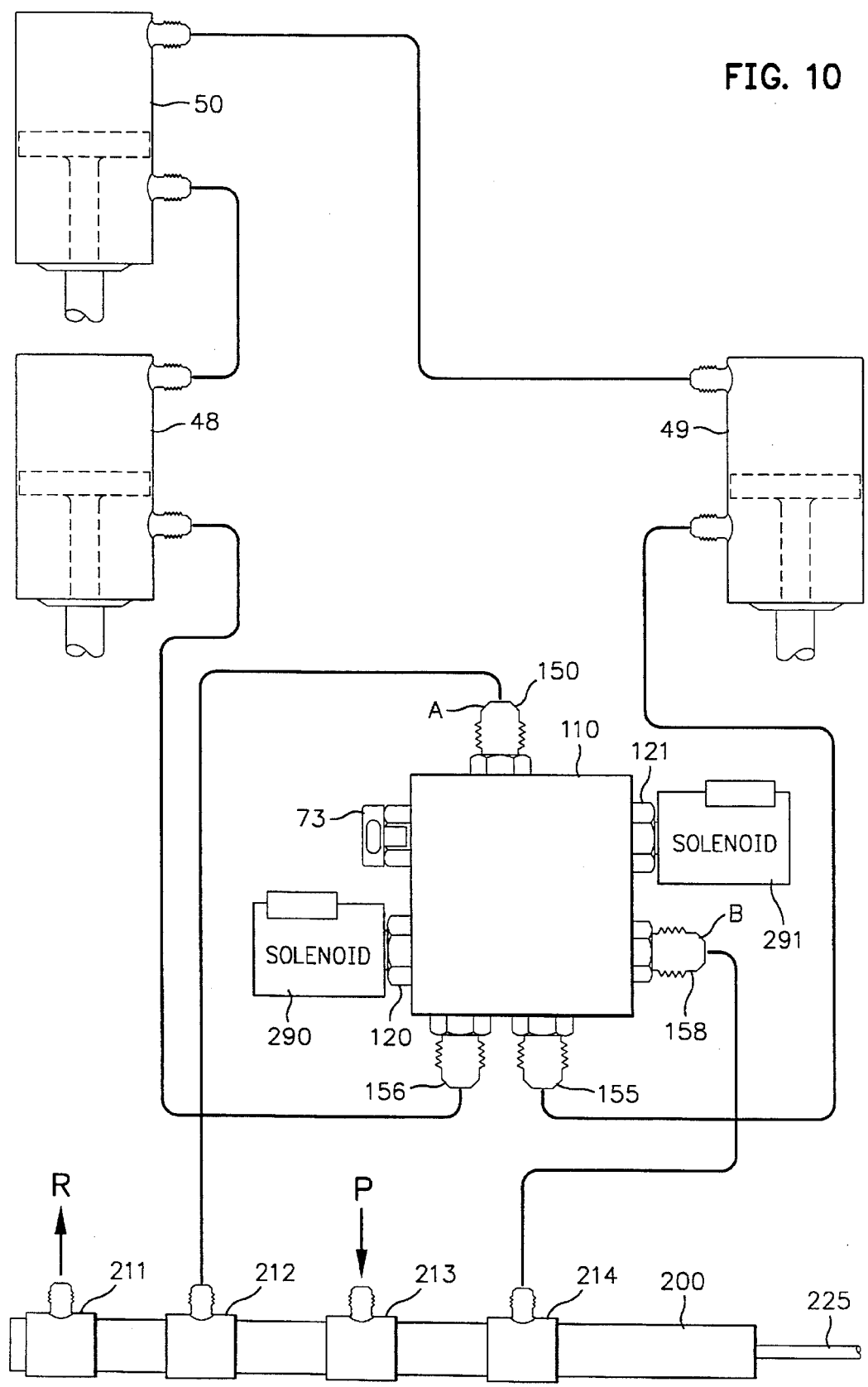
FIG. 10 is a drawing of the interconnections between the valved hydraulic signal source, the control valve assembly, and three cylinder and piston assemblies according to the invention.

FIG. 10 illustrates an arrangement of pads according to the invention that demonstrate how elements illustrated in FIGS. 1, 5, and 6 are interconnected to form a roll correction system with crossover and lockout control according to the invention. In FIG. 10, a roll correction apparatus including the three cylinder and piston assemblies 48, 49, 50 mounted as shown in FIG. 1 is coupled to a hydraulic signal source. For example, the hydraulic signal source can include a valved hydraulic signal source such as the source shown in FIG. 6 that includes the cylinder 200, the piston rod 225, and the four ports 211, 212, 213, and 214. When steering mechanism movement is coupled by the piston rod 225 to the piston that moves inside the cylinder 200, the hydraulic signal source provides the differential hydraulic signal described above in the manner presented in connection with FIGS. 6 and 7A-7C. The hydraulic signal is conditioned as described above to indicate a roll condition. In this regard, the pressurizing and return potentials are provided differentially through the ports 212 and 214. For example, if the pressurizing potential is provided through the port 212, the return potential would be provided through the port 214, and vice versa. The crossover/lockout valve assembly 70 shown in FIG. 5 is connected to the hydraulic signal source and to the roll correction apparatus. In this regard, the ports 212 and 214 are connected, respectively, to the hydraulic connectors 150 and 158 on the direction control valve assembly 70 and are coupled through the four-way, two-position, solenoid-driven valve 120 as described to the hydraulic connectors 155 and 156. The solenoid 290 of the valve 120 is controlled as described above with reference to FIGS. 2, 3, and 4 to either pass through or cross over the differential hydraulic potential from the connectors 150 and 158 to the hydraulic connectors 155 and 156, which are connected to drive the roll correction apparatus in the manner described above. The solenoid 290 is operated to maintain the condition of the hydraulic signal at the hydraulic connectors 155 and 156 as necessary to correct the roll condition when the vehicle is countersteered during a skid so that the differential potentials provided by the hydraulic signal source are reversed. Further included in the combination illustrated in FIG. 10 is the lockout function implemented by the solenoid-controlled, two-way, two-position valve 121. The solenoid 291 of the valve 121 is controlled as described above to prevent provision of the differential hydraulic signal to the roll control apparatus in response to a vehicle speed less than a predetermined vehicle speed.

Clearly, other embodiments and modifications of the present invention will occur readily to those of ordinary skill in the art in view of these teachings. Therefore, this invention is to be limited only by the following claims, which include all such embodiments and modifications.

We claim:

1. A roll correction system for use in a vehicle including a body, wheels, a suspension coupling the body to the wheels, and a steering assembly, comprising:

a roll correction apparatus which is hydraulically actuated by a hydraulic signal indicative of a roll direction;

a hydraulic signal source connected to the roll correction apparatus, the hydraulic signal source including means mechanically linked to the steering assembly and responsive to a first steering direction for providing a hydraulic signal conditioned to indicate a roll direction; and a countersteer correction means for maintaining the condition of the hydraulic signal to indicate the roll direction in response to countersteer in a second steering direction opposite the first steering direction.

2. The roll correction system of claim 1, further comprising means responsive to vehicle speed for preventing provision of the hydraulic signal to the roll correction apparatus in response to a vehicle speed less than a predetermined vehicle speed.

3. The roll correction system of claim 2, wherein the roll correction apparatus includes at least one cylinder and piston assembly for acting between the body and suspension of the vehicle.

4. The roll correction system of claim 3, wherein the hydraulic signal source includes a valve with a cylinder, a piston slidably disposed in the cylinder, and a plurality of ports distributed along, and opening into, the cylinder for generating the hydraulic signal in response to movement of the piston within the cylinder, the linked means including a mechanical coupling connecting the piston to the vehicle steering assembly for movement therewith.

5. The roll correction system of claim 1, wherein the roll correction apparatus includes at least one cylinder and piston assembly for acting between the body and suspension of the vehicle.

6. The roll correction system of claim 1, wherein the hydraulic signal source includes a valve with a cylinder, a piston slidably disposed in the cylinder, and a plurality of ports distributed along, and opening into, the cylinder for generating the hydraulic signal in response to movement of the piston within the cylinder, the linked means including a mechanical linkage connecting the piston to the vehicle steering assembly for movement therewith.

7. The roll correction system of claim 1, wherein the hydraulic signal source responds to the second steering direction by reversing the condition of the hydraulic signal, and the countersteer correction means includes:

first means for generating an electrical signal indicative of a vehicle centrifugal force;

second means for generating an electrical signal indicative of a condition of the hydraulic signal;

third means connected to the first and second means for generating an electrical signal indicative of a countersteer condition; and valve means connected to the third means for reversing the condition of the hydraulic signal provided by the hydraulic signal source in response to the electrical signal indicative of the countersteer condition.

8. The roll correction system of claim 1, further including:

a vehicle speed sensor;

a lockout speed indicator;

a signal generator coupled to the vehicle speed sensor and to the lockout speed indicator for generating a lockout signal when vehicle speed is above lockout speed; and valve means connected to the signal generator for enabling operation of the countersteer correction means in response to the lockout signal.

9. The roll correction system of claim 8, wherein the hydraulic signal source responds to the second steering direction by reversing the condition of the hydraulic signal, and the countersteer correction means includes:

first means for generating an electrical signal indicative of a vehicle centrifugal force;

second means for generating an electrical signal indicative of a condition of the hydraulic signal;

third means connected to the first and second means for generating an electrical signal indicative of a countersteer condition; and valve means connected to the third means for reversing the condition of the hydraulic signal provided by the hydraulic signal source in response to the electrical signal indicative of the countersteer condition.

10. The roll correction system of claim 9, wherein the roll correction apparatus includes at least one cylinder and piston assembly for acting between the body and suspension of the vehicle.

11. The roll correction system of claim 10, wherein the hydraulic signal source includes a valve with a cylinder, a piston slidably disposed in the cylinder, and a plurality of ports distributed along, and opening into, the cylinder for generating the hydraulic signal in response to movement of the piston within the cylinder, the linked mean including a mechanical linkage connecting the piston to the vehicle steering assembly for movement therewith.

* * * * *